United States Patent
Spitzer et al.

(10) Patent No.: US 6,905,727 B2
(45) Date of Patent: Jun. 14, 2005

(54) METHOD FOR SELECTING A FORMULATION FOR ONE OR MORE LAYERS OF A MULTI-LAYER COATING

(75) Inventors: Daniel Spitzer, Ontario (CA); Roelof Johannes Baptist Gottenbos, Leiderdorp (NL)

(73) Assignee: Akzo Nobel N.V., Arnhem (NL)

( * ) Notice: Subject to any disclaimer, the term of this patent is extended or adjusted under 35 U.S.C. 154(b) by 193 days.

(21) Appl. No.: 10/023,188

(22) Filed: Dec. 18, 2001

(65) Prior Publication Data

US 2002/0138211 A1 Sep. 26, 2002

(30) Foreign Application Priority Data

Dec. 19, 2000 (EP) .............................. 00204620

(51) Int. Cl.$^7$ .............................. G01J 3/46; B05D 7/26
(52) U.S. Cl. .................. 427/140; 427/142; 427/402; 427/407.1; 427/409; 427/445; 427/8
(58) Field of Search ................. 427/140, 142, 427/402, 407.1, 409, 445, 8

(56) References Cited

U.S. PATENT DOCUMENTS

| | | | | |
|---|---|---|---|---|
| 4,552,780 A | * | 11/1985 | Abe et al. ..................... | 427/8 |
| 4,813,000 A | * | 3/1989 | Wyman et al. ............. | 382/165 |
| 5,668,633 A | * | 9/1997 | Cheetam et al. ............ | 356/402 |
| 5,871,827 A | * | 2/1999 | Jaffe et al. .................... | 428/29 |
| 5,929,998 A | * | 7/1999 | Kettler et al. ............... | 356/405 |
| 6,108,095 A | * | 8/2000 | Graf ........................... | 356/425 |
| 6,268,440 B1 | * | 7/2001 | Kudo et al. ................. | 525/477 |
| 6,539,325 B1 | * | 3/2003 | Numata et al. ............. | 702/127 |

FOREIGN PATENT DOCUMENTS

WO    WO-97/43052    * 11/1997 ............ B05D/5/06

OTHER PUBLICATIONS

Kubelka and Munk theory (P. Kubelka and F. Munk, "Ein Beitrag zur Optik der Farbanstriche," *Z. tech. Physik.*, Ed. 12, p. 593, 1931).

Hunt; Measuring Colour; Spectral Weighting Functions; Chapter 2 (1987) pp. 32–53.

European Search Report for: EP 00 20 4620, dated: Jul. 6, 2001.

* cited by examiner

*Primary Examiner*—Jennifer Kolb Michener
(74) *Attorney, Agent, or Firm*—Joan M. McGillycuddy

(57) ABSTRACT

A method for selecting a formulation for one or more layers of a multi-layer coating for repair purposes, the multi-layer coating comprising a primer applied on a substrate, at least one base or top coat and, optionally, a clear coat, the method comprising the following steps:

Figure 1:
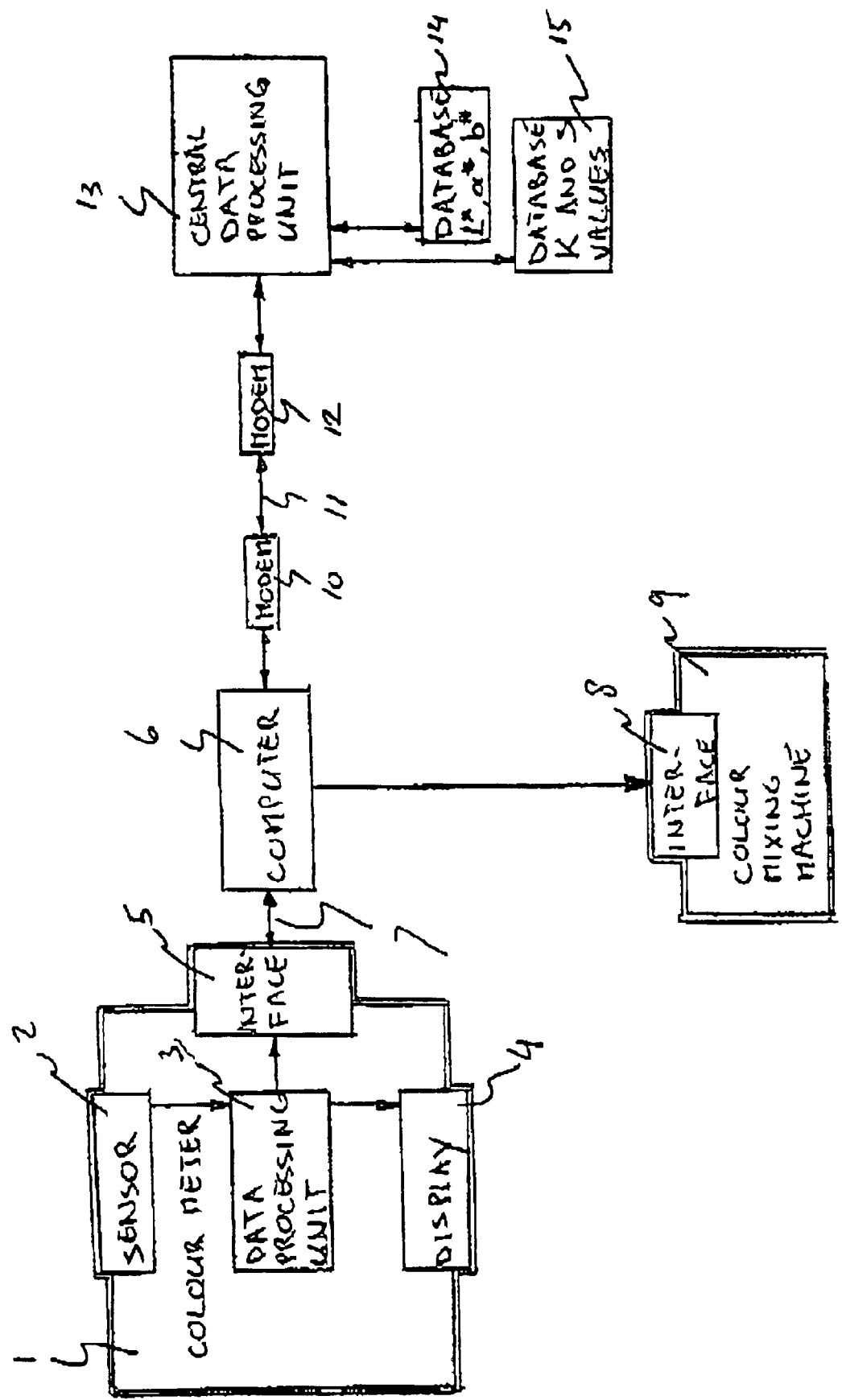

providing a database of colorimetric data relating to a set of formulations and/or relating to constituents for a primer and preferably for one or more base or top coat layers for a multi-layer coating;

entering the colorimetric data of an object to be repaired into a computer having access to said database;

determining the formulation of the primer and, optionally, of one or more base or top coat layers with the aid of the database, in such a way that the resulting color of the multi-layer coating to be applied matches the color of the object to be repaired using the lowest possible amount of coating material.

7 Claims, 1 Drawing Sheet

METHOD FOR SELECTING A FORMULATION FOR ONE OR MORE LAYERS OF A MULTI-LAYER COATING

This application claims priority of European Patent Application No. 00204620.9 filed on Dec. 19, 2000.

SUMMARY OF INVENTION

The invention pertains to a method for selecting coating formulations for a multi-layer coating for repair purposes. Such a multi-layer coating typically comprises a primer applied on a substrate and at least one coating layer. For car repair purposes, the top layer generally is a clear coat, the underlying layer or layers being so-called base coats. If no clear coat is used, the top layer generally is called a top coat. The formulations of the primer and the coating layers are determined in such a way that the resulting colour of the cured multi-layer coating closely matches the colour of the object to be repaired, for example a car, while the amount of coating material needed is minimised.

BACKGROUND OF INVENTION

WO 97/43052 discloses a primer selection method using a grey primer having a reflectance in its dried state which is the same as the reflectance of the top coating measured at the wavelength of minimum absorption of the top coating. Only the grey tone of the primer is adapted to the base coat colour.

Further, it is known to use coloured primers, such as the Colorbuild® primers marketed by Akzo Nobel Coatings, Sassenheim, the Netherlands. A primer is selected which has a colour matching, to some degree, the colour of the object to be repaired. Subsequently, a top or base coat can be applied which matches the colour of the car to be repaired. Due to the close colour match of the primer, a reduced amount of top coat or base coat is needed. A drawback to this system is that there is only a limited number of primer colours available. This limited number of available colours, however, still requires considerable storage space.

U.S. Pat. No. 4,552,780 discloses a method for application of a top coat at incomplete hiding over a colored intercoat. No suggestion is included to select a combination of a primer and a base or top coat matching together an original colour of an object to be repaired.

DETAILED DESCRIPTION OF THE INVENTION

The object of the invention is to provide a method as disclosed in the opening paragraph which allows a further reduction of the amount of coating material required for complete hiding.

The object of the invention is achieved by means of a method comprising the following steps:
- providing one or more databases of colorimetric data relating to a set of formulations and/or relating to constituents for primers and for base or top coat layers;
- entering the colorimetric data of an object to be repaired into a computer having access to said database;
- determining the formulations of the primer and of other layers layers of the multi-layer coating with the aid of the database, in such a way that the resulting colour of the multi-layer coating to be applied matches the colour of the object to be repaired using the lowest possible amount of coating material.

This way, the amount of coating material required can be further reduced, while the match with the colour of the object to be repaired is at least just as close as in the prior art.

The preferred formulation can be determined either by selecting from a given set of predetermined formulations or by calculating the preferred formulation from a set of data of available constituents. These constituents can include base paints, binders, pigment pastes, toners, etc. Some of the constituents, such as toners, can be used in primer formulations as well as in base or top coat formulations.

If the formulation is determined by calculation on the basis of the colorimetric data of the available constituents, the formulations can be produced in situ.

The colorimetric data of the sample can for instance be provided by the input of an unambiguous colour code. Alternatively, or additionally, the colorimetric data can be provided by means of a colour measuring device, such as a spectrophotometer or a related device. A suitable device is for example the AUTOMATCHIC® system, available from Akzo Nobel Coatings in Sassenheim, the Netherlands. Other suitable devices include a MACBETH COLOUR-EYE® 3000, a BYK-GARDNER® 9300 handy-spec spectrophotometer, and an X-RITE® MA-58 spectrophotometer. The colorimetric data can be provided in combination with the trademark of the car to be repaired, if so desired.

Preferably, the $L^*, a^*, b^*$ parameters of the CIE Lab system as proposed by the Commission Internationale d'Eclairage (CIE) are used as the colorimetric data. Parameter "$a^*$" is located at a red-green axis, parameter "$b^*$" is located at a yellow-blue axis, while the "$L^*$" parameter is located at a lightness axis. However, alternative colour coordinates systems, such as the CIE Luv system. may also be used, if so desired.

If the colour is calculated, e.g., from a set of data of available constituents, K and S parameters according to the Kubelka and Munk theory (P. Kubelka and F. Munk, "Ein Beitrag zur Optik der Farbanstriche," Z. tech. Physik., Ed. 12, page 593, 1931) can be used when determining the primer or base coat formulation. The K parameter stands for the absorption factor. The S parameter is the scattering factor.

The selection method according to the invention can be used for the primer formulation only, in combination with the use of a top coat or base coat matching the colour of the object to be repaired. However, it is preferred to select the formulation of more layers, preferably all layers, of the multi-layer coating in such a way that the resulting colour of the total multi-layer coating to be applied matches the colour of the sample. That way, the multi-layer coating as a whole is optimised. Since complete hiding by the top layer is not required, the colour of the lower layers may still be visible and have its effect on the resulting colour. Combinations of hardly intermiscible pigments can be used. For instance, a first base coat layer may comprise effect pigments, such as metallic and pearlescent pigments, while a second base coat or top coat layer comprises solid colour pigments. Since the base coat or top coat does not need to be hiding completely, and the lower layers may be visible to some extent, colours may be formed which would not be reproducible when using a base coat or top coat as the only coloured layer.

Since the colour match of the repaired object and the original sample should be as close as possible from different observation and illumination angles, it is preferred to measure the colorimetric data of the object to be repaired at several angles and for the database to comprise data relating to the colorimetric data of the composition to be selected or determined at these angles. A number of three or more angles is preferred.

It has additional advantages if a primer formulation admixed with top or base coat toners is selected or calculated. This way, the number of primer formulations in stock can be reduced.

The invention is further illustrated by the following examples.

EXAMPLE 1

FIGURE 1 of the accompanying drawing shows a block diagram of a primer selection system according to the present invention. It includes a portable colour meter 1 of a type known as such. The colour meter 1 is used to measure the colour and to determine the $L^*,a^*,b^*$, values of the coating of a car to be refinished for repair purposes. The colour meter 1 includes a sensor 2, a data processing unit 3 for processing the measured data, a display 4, which may for instance be a personal computer screen, for displaying the determined $L^*,a^*,b^*$ values to the user, and an interface 5 to communicate the $L^*,a^*,b^*$ values to a computer 6. After measuring the colour of the car, the colour meter 1 is connected to the computer 6 via a connection 7, which may be a cable or may be wireless, e.g., via infrared transmission. The computer 6 serves, on the one hand, to control a colour mixing machine 9 via an interface 8 and, on the other, to communicate with a central data processing device 13 via a modem 10, a telephone line 11, and a second modem 12. This connection may either be an internet connection or another network connection, or it may be just a temporary or permanent bilateral connection. The central data processing device 13 has access to a first database 14 comprising the $L^*,a^*,b^*$ values of a number of colour formulations, including all available primer formulations and a number of base coat formulations, and to a second database 15 comprising the K and S values of the primer formulations and of a number of pigment pastes for additional tinting of the standard primer formulations and/or basecoat toners, if so desired.

When measuring the colour of a car to be refinished, input data is generated by the sensor 2 of the colour meter 1 and passed on to the colour meter's data processing unit 3 for determining the $L^*,a^*,b^*$ values. These values are displayed on the display 4 of the colour meter 1. The user can check the $L^*,a^*,b^*$ values by repeating the measuring and comparing the displayed values. After measuring, the user can transport the colour meter 1 to the computer 6 and connect the interface 5 of the colour meter 1 to the computer 6 via the connection cable 7. After connection, the data processing unit 3 sends the $L^*,a^*,b^*$ values to the computer 6. At the command of the user, the computer 6 opens a data exchange connection with the central processing device 13 via the modems 8 and 10 and the communication line 9. The central data processing device 13 runs a program calculating for a set of pre-formulated primers the difference dEab between the measured $L^*,a^*,b^*$ values of the original car colour to be matched, on the one hand, and the $L^*,a^*,b^*$ values of a system comprising a layer of a base coat matching the original car colour, applied on the calculated layer of the primer, on the other. For each primer, the minimum base coat layer thickness needed for complete hiding is calculated. The formulation giving the smallest minimum layer thickness is selected. If this minimum layer thickness is lower than a preset limit, the selected primer formulation is communicated to the computer 6, which passes the formulation on to the colour mixing machine 9. The colour mixing machine 9 is a standard apparatus known as such and is used to prepare primer formulations from a limited number of base paints and a set of pigment pastes. On the basis of the output data from the central data processing device 13 the colour mixing machine 9 mixes the required base paint with the required pigment pastes and delivers the selected primer formulation. If the minimum layer thickness is higher than the preset limit, the central data processing device 13 reads the K and S values of the selected primer from the second database 15, combines them with the K and S values of one or more pigment pastes, calculates the $L^*,a^*,b^*$ values of a mixture of the selected primer formulation and the additional pigment paste, and subsequently calculates the minimum layer thickness needed for complete hiding. The formulation consisting of the selected primer formulation and the additional colourants is iteratively formulated in such way that the resulting minimum layer thickness falls below the preset limit. After passing the limit, the adapted formulation is communicated to the computer 6 and passed on to the colour mixing machine for production of the new primer formulation.

EXAMPLE 2, COMPARATIVE EXAMPLES A, B, AND C

The following calculations demonstrate that the layer thickness of the base coat applied when refinishing a car is reduced when a primer according to the present method is selected, in comparison with a conventional white primer or in comparison with a grey primer having a reflectance in its dried state which is the same as that of the top coating measured at the wavelength of minimum absorption of the top coating.

The car door of a red car needs to be refinished after having been damaged. A base coat matching the original colour of the car is selected. The colour of the base coat is represented by the K and S values and the reflection spectrum according to the hiding Kubelka Munk model, given in Table 1.

TABLE 1

| | K and S values and reflection spectrum base coat | | | | | | | | | | | | | | | |
|---|---|---|---|---|---|---|---|---|---|---|---|---|---|---|---|---|
| | 400 | 420 | 440 | 460 | 480 | 500 | 520 | 540 | 560 | 580 | 600 | 620 | 640 | 660 | 680 | 700 |
| $K_{basecoat}$ | 1.534 | 1.547 | 1.590 | 1.640 | 1.686 | 1.699 | 1.562 | 1.157 | 0.639 | 0.229 | 0.067 | 0.032 | 0.027 | 0.027 | 0.027 | 0.028 |
| $S_{basecoat}$ | 0.194 | 0.198 | 0.203 | 0.206 | 0.211 | 0.222 | 0.229 | 0.238 | 0.270 | 0.310 | 0.324 | 0.316 | 0.326 | 0.326 | 0.324 | 0.325 |
| $R_{basecoat}$ | 0.056 | 0.057 | 0.057 | 0.056 | 0.056 | 0.058 | 0.064 | 0.086 | 0.152 | 0.317 | 0.531 | 0.640 | 0.668 | 0.669 | 0.666 | 0.663 |

The used primer selection system also includes a computer having access to a database of K and S values corresponding to a set of toners. On the basis of this database primers can be formulated. The database may for example include the following three toner formulations characterised by their K and S values.

TABLE 2

| | Toner formulations | | | | | | | | | | | | | | | |
|---|---|---|---|---|---|---|---|---|---|---|---|---|---|---|---|---|
| | 400 | 420 | 440 | 460 | 480 | 500 | 520 | 540 | 560 | 580 | 600 | 620 | 640 | 660 | 680 | 700 |
| $K_{White}$ toner | 0.180 | 0.026 | 0.024 | 0.024 | 0.024 | 0.024 | 0.025 | 0.025 | 0.026 | 0.026 | 0.026 | 0.027 | 0.028 | 0.029 | 0.029 | 0.030 |
| $S_{White}$ toner | 1.000 | 1.000 | 1.000 | 1.000 | 1.000 | 1.000 | 1.000 | 1.000 | 1.000 | 1.000 | 1.000 | 1.000 | 1.000 | 1.000 | 1.000 | 1.000 |
| $K_{Black}$ toner | 2.481 | 2.285 | 2.265 | 2.272 | 2.307 | 2.347 | 2.394 | 2.430 | 2.499 | 2.524 | 2.557 | 2.619 | 2.683 | 2.763 | 2.836 | 2.915 |
| $S_{Black}$ toner | 0.074 | 0.066 | 0.061 | 0.056 | 0.052 | 0.051 | 0.047 | 0.042 | 0.045 | 0.040 | 0.040 | 0.032 | 0.030 | 0.029 | 0.029 | 0.028 |
| $K_{Red}$ toner | 1.724 | 1.744 | 1.790 | 1.844 | 1.894 | 1.910 | 1.765 | 1.335 | 0.784 | 0.347 | 0.176 | 0.141 | 0.138 | 0.141 | 0.145 | 0.149 |
| $S_{Red}$ toner | 0.109 | 0.113 | 0.119 | 0.122 | 0.127 | 0.139 | 0.146 | 0.155 | 0.189 | 0.232 | 0.247 | 0.238 | 0.249 | 0.249 | 0.247 | 0.248 |

For Comparative Examples A and B, white and black primers were formulated on the basis of the pure white toner and the black toner of Table 2, respectively. For Comparative Example C, a grey primer was formulated on the basis of a mixture of the white and black toners in accordance with the prior art method of WO 97/43052. For formulating this grey primer, first the wavelength corresponding to the minimum K value of the base coat was determined. According to Table 1, this wavelength is 660 nm. At this wavelength, the reflection is R=0,669. A grey primer formulation, a mixture of 98% of the white toner and 2% of the black toner of Table 2, having about the same reflection, namely R=0,67, was selected.

For Example 2, a set of three red primers was formulated on the basis of the toners of Table 2. The first red primer formulation was a mixture of 60% of the white toner and 40% of the red toner. The second red primer was a mixture of 35% of the white toner and 65% of the red toner. The third red primer was a mixture of 10% of the white toner and 90% of the red toner. The third primer gave the lowest dEab value relative to the L*,a*,b* values of the hiding base coat of Table 1.

For each primer, the reflectance spectrum can be calculated. The formula for calculating the theoretical reflection values $R_t$ for hiding and non-hiding layers using the Kubelka-Munk model for solids, is as follows:

$$R_t(\lambda) = \frac{(A+B)*((A-B) - R_g(\lambda))e^{-2BS(\lambda)D} - ((A+B) - R_g(\lambda))*(A-B)}{((A-B) - R_g(\lambda))e^{-2BS(\lambda)D} - ((A+B) - R_g(\lambda))}$$

where:  $A = K(\lambda)/S(\lambda) + 1$
  $B = ((K(\lambda)/S(\lambda))^2 + 2*K(\lambda)/S(\lambda))^{0.5}$
  $D$ = layer thickness
  $\lambda$ = wavelength
  $R_t(\lambda)$ = theoretical reflectance value
  $R_g(\lambda)$ = reflectance of background
  $S(\lambda)$ = scattering factor of the coating at wavelength $\lambda$
  $K(\lambda)$ = absorption factor of the coating at wavelength $\lambda$ The reflection values of the primer formulations were as shown in Table 3, wherein $R_{white}$ is the reflection of the white primer of Comparative Example A, $R_{black}$ is the reflection of the black primer of Comparative Example B, and $R_{grey}$ is the reflection of the grey primer of Comparative Example C. $R_{red1}$, $R_{red2}$, and $R_{red3}$ are the reflections of the primers of Example 2.

TABLE 4

| | Reflection values of primers (hiding) | | | | | | | | | | | | | | | |
|---|---|---|---|---|---|---|---|---|---|---|---|---|---|---|---|---|
| | 400 | 420 | 440 | 460 | 480 | 500 | 520 | 540 | 560 | 580 | 600 | 620 | 640 | 660 | 680 | 700 |
| $R_{White}$ | 0.553 | 0.795 | 0.805 | 0.805 | 0.804 | 0.803 | 0.801 | 0.800 | 0.797 | 0.796 | 0.795 | 0.793 | 0.790 | 0.787 | 0.785 | 0.782 |
| $R_{Black}$ | 0.014 | 0.014 | 0.013 | 0.012 | 0.011 | 0.011 | 0.010 | 0.009 | 0.009 | 0.008 | 0.008 | 0.006 | 0.005 | 0.005 | 0.005 | 0.005 |
| $R_{Grey}$ | 0.514 | 0.684 | 0.690 | 0.690 | 0.688 | 0.686 | 0.683 | 0.681 | 0.678 | 0.676 | 0.674 | 0.671 | 0.668 | 0.664 | 0.660 | 0.657 |
| $R_{Red1}$ | 0.236 | 0.253 | 0.250 | 0.246 | 0.242 | 0.242 | 0.254 | 0.298 | 0.386 | 0.519 | 0.612 | 0.636 | 0.638 | 0.634 | 0.631 | 0.627 |
| $R_{Red2}$ | 0.134 | 0.138 | 0.136 | 0.134 | 0.132 | 0.132 | 0.142 | 0.175 | 0.254 | 0.393 | 0.506 | 0.537 | 0.541 | 0.538 | 0.533 | 0.529 |
| $R_{Red3}$ | 0.056 | 0.057 | 0.057 | 0.056 | 0.056 | 0.058 | 0.064 | 0.084 | 0.141 | 0.265 | 0.382 | 0.415 | 0.424 | 0.420 | 0.415 | 0.411 |

For determining the L*,a*,b* values of the primers, a very substantial layer thickness D can be chosen, which simplifies the formula to the hiding Kubelka Munk model $R_t(\lambda)$= A−B, with A and B being defined as above. The L*,a*,b* values can be calculated from the $R_t(\lambda)$ values in a way readily known to the skilled man, as described in any standard reference book on colour measurement, e.g., as in *Measuring Colour* by R. W. G. Hunt, Chapter 2, 1987, Ellis Horwood Ltd., Chichester, ISBN 0-7458-0125-0, which is hereby incorporated by reference.

The colour difference between two different colours, expressed as dEab, is calculated the following way:

$$dEab = \sqrt{(dL^2 + da^2 + db^2)}$$

wherein dL* is the difference in L* values, da* is the difference in a* values, and db* is the difference in b* values. Based on this equation and the above-mentioned Kubelka Munk model, the minimum base coat layer thickness D needed for complete hiding can be calculated for each of the primers. Complete hiding is defined as the degree of hiding giving a colour difference dEab≦0.1 in comparison with a layer of infinite thickness of the same base coat.

It was calculated in Example 2 that the first red primer would require a base coat layer thickness of 6.4 μm, whereas the second red primer would require a base coat layer thickness of 14.2 μm and primer 3 would require a base coat layer thickness of 16.4 μm. Subsequently, the first red primer was selected In Comparative Example A, it was calculated that the required minimum base coat layer thickness on a white primer was 16.1 μm. This means that about 2.5 times more base coat was needed for the same degree of hiding. The difference was even higher when compared with the black primer of Comparative Example B, which required a minimum base coat layer thickness of 18.8 μm. The grey primer of Comparative Example C required a minimum base coat layer thickness of 10.3 μm, still about 1.6 μm more than the base coat layer thickness when applying the method according to the invention.

We claim:

1. A method for selecting coating formulations for a multi-layer coating for repair purposes, the multi-layer coating comprising a primer applied on a substrate, at least one base or top coat and, optionally, a clear coat, the method comprising the following steps:

providing one or more databases of colorimetric data relating to a set of formulations and/or relating to constituents for a primer and base or top coat layers;

entering the colorimetric data of an object to be repaired into a computer having access to said database;

determining the formulation of the primer and of the other layers of the multi-layer coating with the aid of the database, in such a way that the resulting colour of the total multi-layer coating to be applied matches the colour of the object to be repaired using the lowest amount of coating material by allowing the color of the lower layers to be visible and have an effect on the resulting colour.

2. The method according to claim 1, wherein the formulation is determined by selecting from a given set of predetermined formulations.

3. The method according to claim 1, wherein the formulation is determined by calculating from a set of data of available constituents, e.g., K and S values.

4. The method according to claim 1, wherein a primer is selected or calculated which closely matches the colour of the object to be repaired.

5. The method according to claim 1, wherein the colorimetric data of the object to be repaired are measured from several, preferably three or more, angles and in that the database comprises data relating to the colorimetric data of the composition to be selected or determined at these angles.

6. The method according to claim 1, wherein a primer formulation admixed with top or base coat toners is selected or calculated.

7. The method according to claim 1, wherein the colorimetric data in the database comprises $L^*, a^*, b^*$ parameters according to the CIE Lab system.

* * * * *